Oct. 22, 1957     W. F. HENRY ET AL     2,810,619
                  TOLL HIGHWAY RECORDER
Filed April 13, 1954                    8 Sheets-Sheet 2

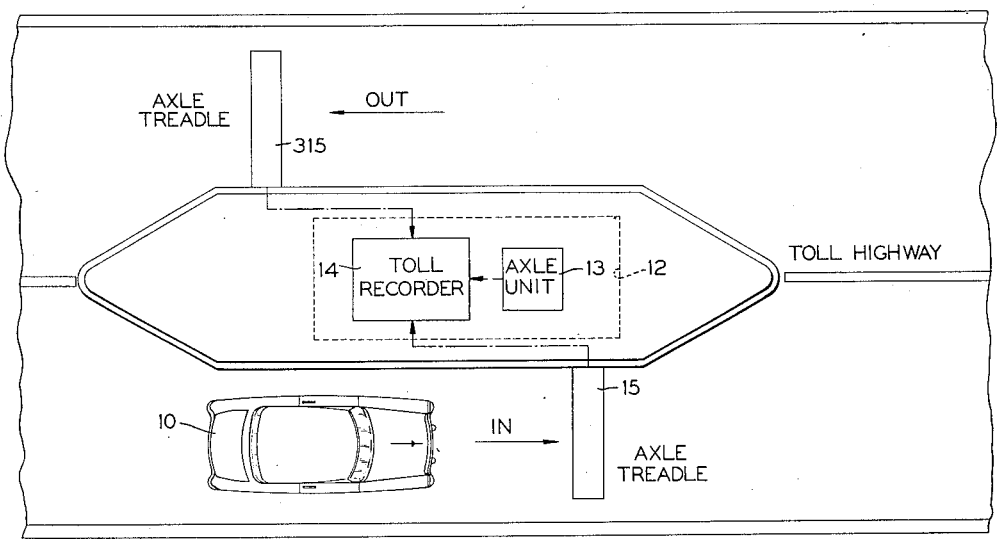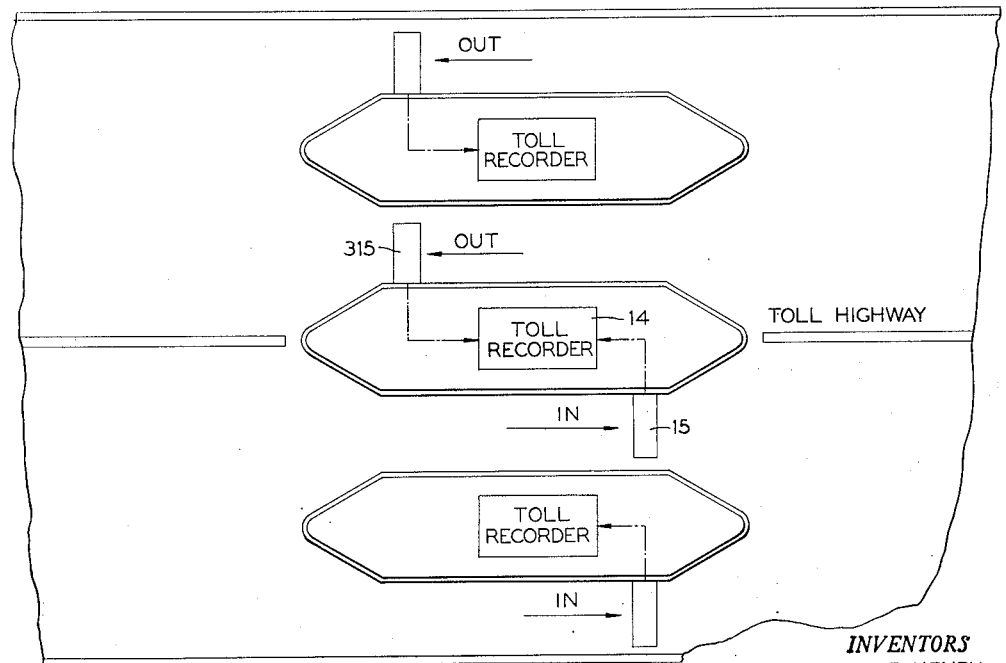

| TOLL COLLECTOR NO. 44771 | | | | | | | | | |
|---|---|---|---|---|---|---|---|---|---|
| NAME John Doe | | | | 30 | 29 | 31 | 32 | | 34 |
| | EX. | 23 | 23 | 5 | AUG. 16 | 3:05 PM | A | 0 0 0 | 87194 |
| | ENT | 23 | 23 | 5 | AUG. 16 | 3:05 PM | A | 0 0 0 | 87195 |
| | | | L | | DATE | TIME | A R E | | Q |
| | | | | | | | 33 | | |

STATE HIGHWAY TURNPIKE
TOUR OF DUTY RECORD

FIG. 3                                    28

| | | | | | 27 | | | 27 | | | 25 | 26 | | | | | |
|---|---|---|---|---|---|---|---|---|---|---|---|---|---|---|---|---|---|
| | | | | 2.50 | 0.20 | 1.25 | 1.60 | 2.50 | | 10229 | 3 | 2.50 | 0.20 | 1.25 | 1.60 | 2.50 |
| | | | | 19 | 11 | 15 | 18 | 23 | | NUMBER | C.L. | 19 | 11 | 15 | 18 | 23 |

| NUMBER 10229 | | | | 16 | | | 16 | 17 | 19 | 18 | 20 | 21 | 22 |
|---|---|---|---|---|---|---|---|---|---|---|---|---|---|
| | | EX. | 23 | | | 23 | 5 | AUG. 16 | 2:56 PM | 2 | 1 | 3 | 0 | 87162 |
| C.L. 3 | | ENT. | 19 | | | 19 | 1 | AUG. 16 | 11:56 AM | 3 | 0 | 0 | T | 62891 |
| | | | | | | L | | DATE | TIME | A | R | E | | Q |

STATE HIGHWAY          STATE HIGHWAY TURNPIKE
TURNPIKE               ENTRANCE STATION NO. 19
                       CITY, STATE

STUB                   TICKET

FIG. 4
                                              11

INVENTORS
WILLIAM F. HENRY
JOSEPH J. PURCELL
BY
J. Jancin Jr.
ATTORNEY

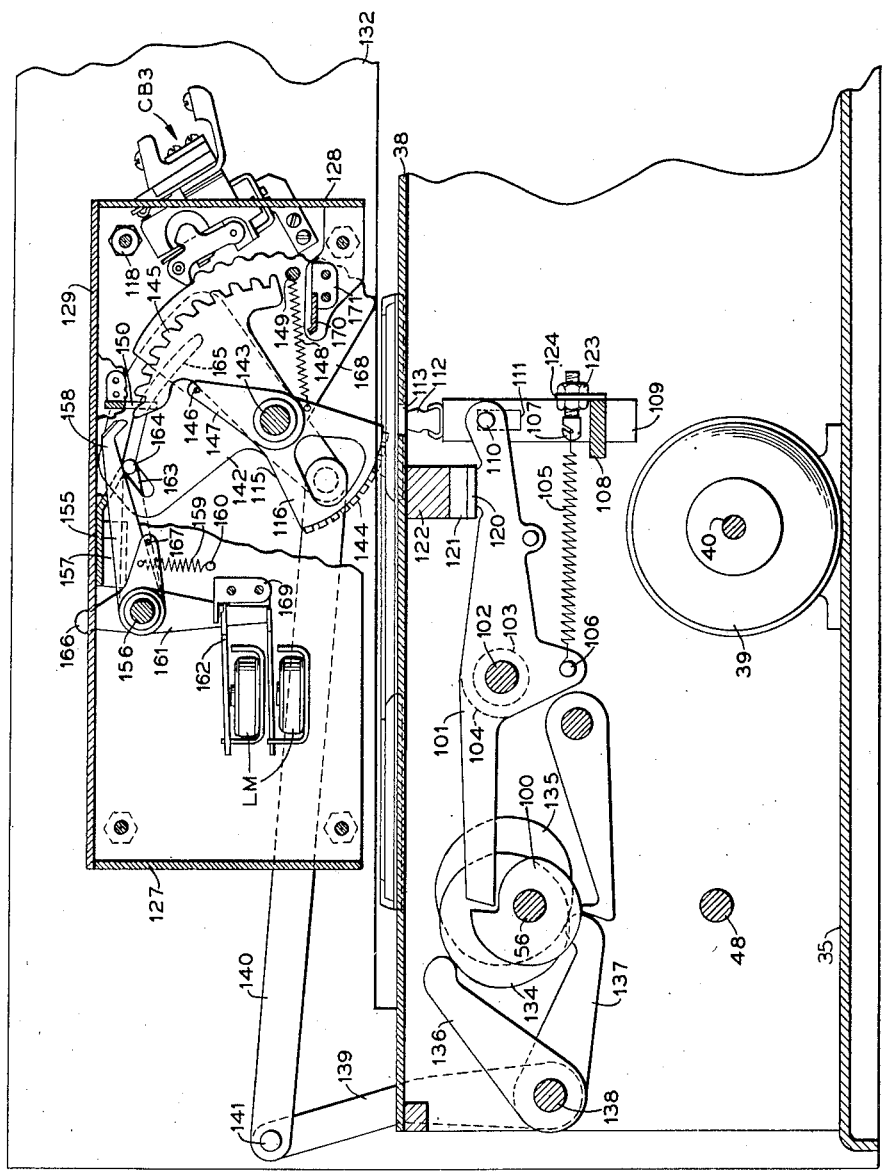

Oct. 22, 1957   W. F. HENRY ET AL   2,810,619
TOLL HIGHWAY RECORDER
Filed April 13, 1954   8 Sheets-Sheet 4

INVENTORS
WILLIAM F. HENRY
JOSEPH J. PURCELL
BY
J. Jancin Jr.
ATTORNEY

INVENTORS
WILLIAM F. HENRY
JOSEPH J. PURCELL
BY
ATTORNEY

Oct. 22, 1957 W. F. HENRY ET AL 2,810,619
TOLL HIGHWAY RECORDER
Filed April 13, 1954 8 Sheets-Sheet 6

INVENTORS
WILLIAM F. HENRY
JOSEPH J. PURCELL
BY
*J. Tancin Jr.*
ATTORNEY

Oct. 22, 1957 W. F. HENRY ET AL 2,810,619
TOLL HIGHWAY RECORDER
Filed April 13, 1954 8 Sheets-Sheet 7

INVENTORS
WILLIAM F. HENRY
JOSEPH J. PURCELL
BY
J. Tancai Jr.
ATTORNEY

INVENTORS
WILLIAM F. HENRY
JOSEPH J. PURCELL

ATTORNEY

2,810,619

TOLL HIGHWAY RECORDER

William F. Henry, Endicott, and Joseph J. Purcell, Endwell, N. Y., assignors to International Business Machines Corporation, New York, N. Y., a corporation of New York Application April 13, 1954, Serial No. 422,788

4 Claims. (Cl. 346—40)

This invention relates to toll highway recorders in general, and to dual-purpose In-Out type toll highway recorders in particular.

As is stated in copending U. S. patent application Serial No. 398,358, filed on December 15, 1953, success of the famous Pennsylvania Turnpike, first of the truly modern "pay-by-the-mile" toll highways, has created a tremendous interest in the operation of toll highways. Good business demands wise economy which, in turn, calls for accurate and honest records. As will be described in detail hereinafter, the embodiment of this invention causes information relating to the operation of a toll highway recorder to be recorded on trip cards and tour-of-duty cards so that dishonest practices and/or unintentional errors may be readily detected. A trip card is associated with a vehicle passing over the toll highway, whereas a tour-of-duty card is associated with a toll collector and is used for much the same purpose as are ordinary time cards.

The dual-purpose In-Out type toll highway recorder to be described hereinafter, is one which may be used as either an In recorder or an Out recorder. That is, this is a single toll recorder which is associated with two axle treadles, one of which is located in the toll highway entrance, or In, lane, and the other of which is located in the toll highway exit, or Out, lane. Dual-purpose recorders are used quite frequently to alleviate relatively short time peak loads. For example, referring to Fig. 2, during the morning hours the dual-purpose recorder 14 may be set to accommodate vehicles entering the toll highway so as to afford two In lanes and only one Out lane at the highway terminal, whereas during the evening hours the dual-purpose recorder 14 may be set to accommodate vehicles leaving the toll highway so that there are two Out lanes and only one In lane at the highway terminal. At all times other than the aforementioned morning and evening peak loads, the dual-purpose recorder may be rendered inactive, whereby only one In lane and one Out lane are provided at the terminal.

Along with the provision of a simple means whereby the dual-purpose recorder may be changed from an entrance recorder to an exit recorder, and vice versa, the possibility of dishonest practices and/or unintentional errors is greatly enhanced. Accordingly, a general object of this invention is to provide an improved toll highway recorder for detecting and recording dishonest practices and/or unintentional errors.

It is another object of this invention to provide an efficient toll highway recorder for recording accurate information which relates to vehicles passing over the toll highway in either direction.

In the embodiment of this invention, the dual-purpose toll recorder is installed in a toll, or vehicle stop, booth 12 (see Fig. 1) in which the toll collector is stationed. One treadle for counting vehicle axles is located in the In lane a few feet beyond the toll booth opposite which the vehicles must stop, and another treadle for counting vehicles axles is located in the Out lane, also a few feet beyond the toll booth opposite which the vehicles must stop. A directional relay unit associated with each treadle distinguishes between axles passing over the treadle in a forward direction and in a reverse direction in either lane in order to provide a separate record of all axle counts.

In the preferred embodiment of the present invention, to change the setting of the dual-purpose recorder and to render operative only the directional relay unit associated with the treadle to be rendered active, the toll collector must shift the card receiver of the toll recorder to a new setting. Inasmuch as there are only two lanes, there need be oly two card receiver settings.

The toll recorder to be described hereinafter is one which is controlled to effect a single toll recorder operation whenever the card receiver thereof is shifted in order to provide an accurate record of the number of times that the card receiver is shifted. Assume that a vehicle leaving the toll highway is approaching the vehicle stop booth 12 shown in Fig. 1 via the Out lane. It normally is a simple matter for a dishonest toll collector to render active the In lane treadle apparatus, and render inactive the Out lane treadle apparatus, so that as the outgoing vehicle passes over the Out lane treadle, there is no exit information relating to the said vehicle entered in the recorder. Thereupon, the fare collected by the toll collector can be kept by the collector for his personal use.

To prevent the foregoing practices it is another object of this invention to provide a dual-purpose toll highway recorder which is operated each time the recorder is set to accommodate a different vehicle lane.

Other objects of this invention will be pointed out in the following description and claims, and illustrated in the accompanying drawings, which disclose by way of example, the principle of the invention and the best mode, which has been contemplated, of applying that principle.

In the drawings:

Fig. 1 is a block diagram of a dual-purpose In-Out type toll highway recording apparatus located at a highway terminal.

Fig. 2 is a block diagram of a typical multi-lane toll highway terminal.

Fig. 3 is a view of a tour-of-duty card.

Fig. 4 is a view of a trip card.

Fig. 5 is an elevational view of the printing and hammer mechanism.

Figure 6:
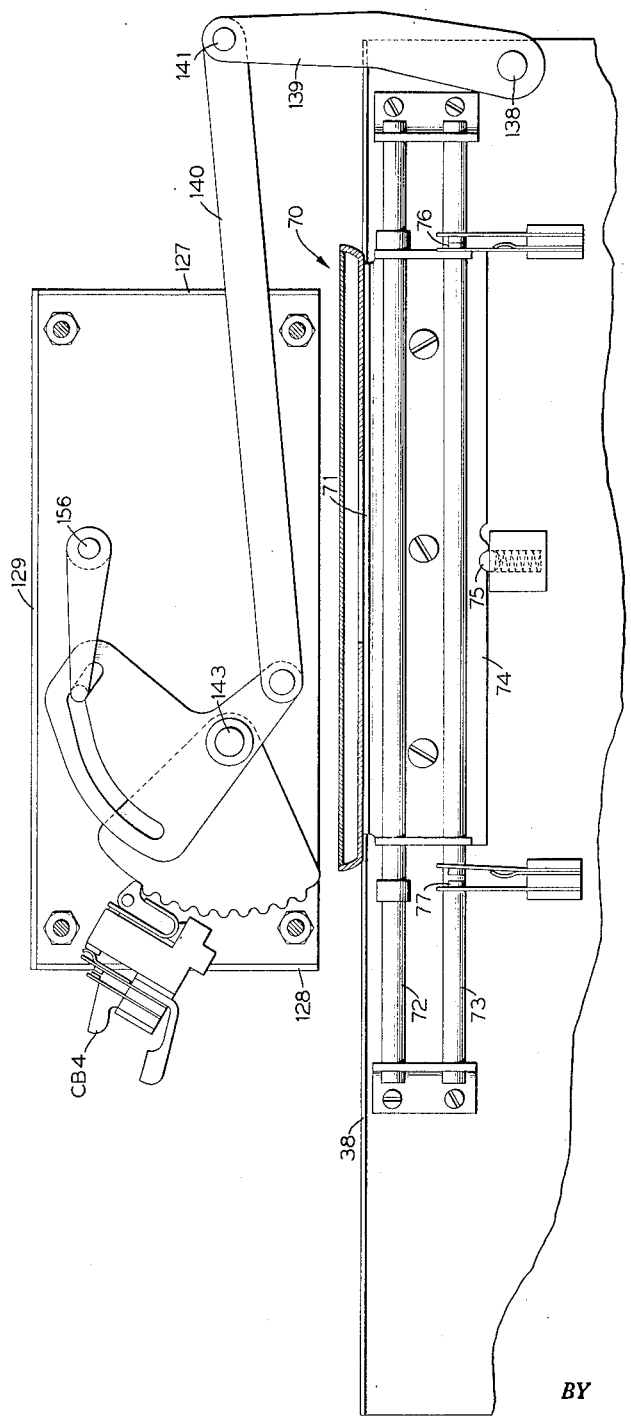
Fig. 6 is an elevational view of the manually shiftable card receiver mechanism.

Figs. 7a, 7b, 7c and 7d, taken together, constitute a wiring diagram of the machine.

General description

Prior to describing the various mechanical and electrical components of the present invention which cooperate to afford an improved toll highway recorder apparatus, the same will first be described briefly and in a general way so as to present an explanation of the over-all operations of the apparatus.

A toll highway recorder system includes at least two highway terminals, one a vehicle entrance station and the other a vehicle exit station. Since the embodiment of this invention can be used at either highway terminal, only a single dual-purpose toll recorder highway apparatus as is shown in block form in Figs. 1 and 2, will be described.

Assuming first that the apparatus shown in Fig. 1 is set to operate at a vehicle entrance station, a vehicle 10 which is entering the toll highway via the In lane must first be stopped at the entrance station so that specific information relative to toll recording may be entered upon a trip card 11 (see also Fig. 4). This vehicle is stopped opposite toll booth 12 for examination by the toll collector, whereupon the latter makes a determination of the classification of the vehicle. The classification of different types of vehicles is preferably outlined by the authority which controls the operation of the toll highway. This authority may, for example, assign a classification 1 to all passenger vehicles whose manufacturer's, or licensing, weight is under 3500 pounds, and a classification 2 to all passenger vehicles whose weight is over 3500 pounds. The authority may determine that lightweight delivery trucks, for example the so-called quarter ton pick-up trucks, are in classification 3, etc.

The toll collector at the entrance station is supplied with different classes of trip cards, each class corresponding to a different classification category. This is necessary because the vehicle classification is a partial determining factor of the toll to be paid by a vehicle operator for the privilege of passing over the highway.

In addition to determining the classification of the vehicle, the toll collector manually sets up an axle count in axle unit 13, said count corresponding to the number of axles on vehicle 10.

The toll collector next obtains a trip card 11 of a class corresponding to the vehicle classification from a convenient card rack for insertion into the card receiver of the toll recorder 14. As is shown in Fig. 4, trip card 11 has the general appearance of the well-known IBM tabulating record card. Complete insertion of the trip card will render electric circuits operative which cause the following information to be recorded upon the card along the line labeled "ENT.":

(1) The entrance station terminal number in column 16.

(2) The lane number in column 17 to indicate the lane through which vehicle 10 passes to enter the toll highway.

(3) The time in column 18, and the day in column 19, at which the trip card has the information entered thereupon.

(4) The number of vehicle axles in column 20, said number being set up in manually settable axle unit 13 (see also Fig. 1).

(5) The number of reverse axles in column 21 to indicate the number of axles carried by the vehicle preceding vehicle 10 and crossing treadle 15 in a reverse direction.

(6) An axle error count in column 22 to depict the difference count between the actual number of axles carried by the vehicle preceding vehicle 10 and the number of axles set up on axle unit 13 for the said preceding vehicle.

(7) A power failure "P," or a weighted treadle "T," or a properly functioning recorder "O," in column 23.

(8) A toll recorder operation sequence count in column 24.

As is shown in Fig. 4, the trip card also has imprinted thereon at both ticket and stub portions, the following information:

(1) Trip card sequence number in column 25.
(2) Vehicle classification number in column 26.
(3) The toll amount in column 27, the amount being due when the vehicle leaves the toll highway at one of the designated exit stations.

After the trip card is processed in recorder 14 (Fig. 1), the trip card is removed from the card receiver and placed into the custody of the vehicle operator. The operator is then permitted to leave the entrance station and to pass over the highway towards his destination to the terminal at which an exit station is located.

Prior to entering the toll highway proper, however, vehicle 10 passes over axle treadle 15. The number of axles passing over the treadle in a forward direction, i. e., in a direction towards the highway, are accumulated in a forward axle counter. In the event the vehicle is moved over the treadle in a reverse direction after having passed over the treadle in a forward direction, the number of axles passing over the treadle in a reverse direction is accumulated in a reverse axle counter. Both of the aforementioned counters are located in toll recorder 14, and are used to control the printing upon trip card 11 of the information designated by reference numerals 21 and 22.

The number of axles passing over treadle 15 in a forward direction is compared with the axle count set up on axle unit 13 by the toll collector. This provides an axles-in-error indication designated by reference numeral 22, and is effected in the following fashion:

The selection of a number of axles on axle unit 13 causes the tens complement, or a subtractive, count of the vehicle axles set up on the unit to be entered in an axle count accumulator in toll recorder 14. The passage of the vehicle for which the axle unit was set up, over axle treadle 15, causes an additive count of the actual number of axles to be entered in the afore-mentioned accumulator. Of course, if the data representing the two axle counts are equal, the accumulator will have a zero total after the vehicle passes completely over the treadle. If, however, one axle count is more or less than the other axle count, the axle count accumulator in toll recorder 14 will have a plus or minus total, respectively, therein. It is apparent that since the trip card associated with the vehicle is processed before the vehicle passes over treadle 15, the axles-in-error indication in column 22, i. e., the axle count difference represented as a total in the axle count accumulator, cannot be entered upon the trip card associated with the vehicle, but must be entered upon a trip card processed subsequent to the vehicle passing over the treadle. In the instant embodiment, the next card processed after the vehicle passes over the treadle is selected to have this information recorded thereon.

Assuming the dual-purpose toll highway recorder apparatus shown in Fig. 1 is set to operate as a vehicle exit station, vehicle 10 is stopped opposite toll booth 12 prior to passing over Out treadle 315. The vehicle is examined once again by an exit station toll collector whereupon the number of vehicle axles is determined for a second time. Thus, in accordance with the number of axles determined to be on the vehicle, the toll collector will manually set up an axle count in unit 13. Trip card 11 which was placed in the custody of the vehicle operator at the entrance station, is taken by the exit station toll collector for insertion into the card receiver of exit station toll recorder 14. Complete insertion of the trip card into the card receiver will render the toll recorder apparatus operative whereby the same type of information as is recorded at the entrance station, is recorded at the exit station along the line designated "EX." (see also Fig. 4).

After the trip card 11 associated with vehicle 10 is processed at the exit station, the toll collector will determine the toll to be paid by the vehicle operator. This determination is made by referring to a toll chart comprising column 27 having toll data imprinted upon the fact of the trip card. The amount of the toll to be paid for the privilege of passing over the toll highway is selected from this chart simply by reading the amount designated above the exit station number. The amounts imprinted upon the trip card are initially determined by the toll highway authority on the basis of distance traveled over the toll highway by the vehicle operator, and the classification of the vehicle. This means, of course, that each entrance station must have assigned thereat different classes of trip cards each of which is associated with the station.

Two types of irregular operation of a toll highway recorder apparatus, are indicated on a trip card processed after the irregularity is corrected. These irregular operations are designated as a power supply interruption and a weighted-treadle condition. A power supply interruption will cause the letter "P" to be recorded in column 23 during the first recorder operation after power is restored. A weighted-treadle will cause the letter "T" to be recorded in column 23 during the period of the irregularity, and during the first recorder operation after the weighted-treadle condition is corrected.

In addition to lighting a signal light in response to any one of given irregularities, a toll recorder governing means is controlled so that a toll recorder operation is not automatic upon the insertion of a trip card into the card receiver. An error switch must be depressed so as to assure that the attention of the toll collector is directed to the irregularity.

The toll recorder also registers the toll collector's attendance time on a tour-of-duty card 28 (see Fig. 3) similar to trip card 11. For this function, the axle selection lever in axle unit 13 is set to an "A" position so that an axle count is not entered into the axle count accumulator in recorder 14. A tour-of-duty operation, however, registers the time in column 29, the date in column 30, in addition to an "A" for attendance in axles column 31. Any axle error count and a reverse axle count that is in the recorder due to a preceding vehicle, is also recorded in columns 32 and 33, respectively, as is the sequence number of recorder operation in column 34. It may be seen that when the toll collector registers his attendance at the beginning and at the end of his daily work shift by means of the toll recorder assigned to him as his responsibility, the sequence number difference count will signify the number of toll recorder operations during his tour of duty.

As mentioned hereinbefore, the toll recorder is caused to operate whenever the card receiver is shifted from one position to another one. In order to change the setting of the dual-purpose recorder properly, however, it is necessary to insert a tour-of-duty card into the card receiver thereof so as to effect a normal tour-of-duty card recorder operation. Thereafter, and with the tour-of-duty card remaining in the card receiver, the said receiver is shifted to the other position so that the resulting recorder operation will cause the tour-of-duty information to be recorded along the second line of the tour-of-duty card. When it is desired to return the card receiver to the original position, a second tour-of-duty card is inserted in the card receiver to effect a normal tour-of-duty recorder operation, after which the receiver with the tour-of-duty card therein is shifted to the original position. The recorder operation which occurs as a result of the card receiver shift causes tour-of-duty information to be recorded along the second line of the tour-of-duty card. It is apparent that this type of operation will afford a record of every recorder cycle due to shifting of the card receiver. In the event, however, that the card receiver is shifted from one position to the other while there is no card in the card receiver, a record of such an operation will not be available, and a subsequent check of the toll recorder operation sequence count registered on the tour-of-duty card processed at the beginning of the toll recorder's tour-of-duty and at the end of the toll recorder's tour-of-duty, will indicate that recorder operations are unaccounted for.

*Drive mechanism*

Inasmuch as the drive mechanism for the subject toll recorder is described in detail in the afore-mentioned copending U. S. patent application Serial No. 398,358, the drive mechanism will be described herein only briefly so as to avoid undue prolixity.

Referring to Fig. 5, the lower half of the recorder mechanism is housed within a box-like structure comprising a base plate 35, a top plate 38, and a plurality of sideplates. Looking at the back of the machine, as viewed in Fig. 5, there is shown supported on the base plate 35 a drive motor 39 having a drive shaft 40 which by suitable drive means including a belt, pulleys and a gear train, is adapted to operate a large gear (not shown) rotatably mounted on a shaft 48 journaled in the front and rear plates. Fixed to shaft 48 is another gear (not shown) which is used to drive the main cam shaft 56 also journaled in the front and rear plates.

A single cycle clutch, described in detail in the afore-mentioned copending patent application, is provided to connect shaft 48 and other driven mechanism to drive mechanism represented by motor 49 and continuously rotating shaft 40. When solenoid 65 (see also Fig. 7a) is energized by electrical means to be later described, the afore-mentioned clutch is operated so as to cause a recorder operation. A mechanical provision is made so that if for any reason solenoid 65 should remain energized longer than one cycle, only a single recorder operation will nevertheless be effected.

The rear plate supports a synchronous motor 91 (Fig. 7a) whose shaft has fastened thereto a single lobe cam 93. The cam is caused to make one revolution per minute as long as power is applied to the synchronous motor in the recorder. The cam 93 operates upon a pair of timer contacts 94 mounted in a block which is also attached to the rear plate. The timer contacts 94 will close once each minute, and are provided to advance the time and date printing wheels (not shown).

*Printing mechanism*

The printing of data on the record card is accomplished by means of a cam controlled print hammer. Referring to Fig. 5, the main cam shaft 56 supports the cam 100 which has an associated hammer link 101 pivotally mounted on a shaft 102 which, in turn, extends between the front and rear plates. The hammer link 101 has integral therewith a collar 103 which is pivoted on shaft 102 and jointed to a second link 104 pivoted on shaft 102. The link 101 is normally urged counterclockwise against the periphery of cam 100 by a spring 105 extending between a stud 106, connecting said links 101 and 104, and a threaded anchor 107 fastened to a guide member 108. The guide member 108 is fastened between the front and rear plates 36 and 37.

The two links 101 and 104 embrace a printing hammer 109 and are connected thereto by means of a pin 110 which extends through a slot 111 in the hammer. The hammer 109 is slideable in the guide member 108 and has mounted on its top edge a platen 112 which extends along an opening 113 in the top plate 38. The hammer 109 is moved upward with the platen 112 driving the record card against an inked ribbon (not shown) and the type sectors 115 and 116 each time that the hammer link 101 drops off the high dwell of cam 100, said cam 100 making one revolution each time that the motor contacts 80 (see also Fig. 7a) are closed consequent upon the energization of solenoid 65. The upward blow is cushioned by means of a shoulder 120 on the hammer links 101 and 104 contacting a rubber block 121 attached to bar 122 which extends between the front and rear plates 36 and 37. The strength of impression of the hammer may be adjusted to compensate for varying thicknesses of the record card by adjusting the threaded anchor 107 to which the tension spring 105 is attached. The lock nut 123 positions and retains the anchor in the plate 124 which forms a part of the guide member 108.

The sector mechanism is housed within a box-like structure which is supported above the top plate 38. The structure comprises a front plate, a rear plate, two side plates 127, 128 and a top plate 129. The front and rear plates are positioned by threaded spacers which are fastened to the rear plate by screws, and the entire structure is supported on the front wall of the recorder casing by means of suitable screws.

The operation of the printing sector mechanism is under control of a pair of complementary cams 134 and 135 (Fig. 5) fastened on the main cam shaft 56 of the recorder. When shaft 56 is caused to make a revolution, as previously described, said complementary cams will act upon a pair of associated follower arms 136 and 137 fastened to a shaft 138 journaled in the front and rear plates to cause said shaft 138 to oscillate, first in a clockwise direction and then in a counterclockwise direction. Fastened to the shaft 138 is a lever 139 which is connected to a driving link 140 by means of a stud 141. The other end of driving link 140 is fastened to a cam member 143 which is fastened on a sector shaft 143 journaled in the front and back plates, and as a result, shaft 143 will oscillate with shaft 138.

Pivotally mounted on shaft 143 are two type sectors 115 and 116 for printing the number of axles-in-error in column 22 (see Fig. 2) and the number of reverse axles in column 21, respectively. Each of these sectors contains a series of ten type elements 144 for printing the numerals 0–5 inclusive. The upper portions of sectors 115 and 116 each contain a series of ten ratchet tooth spaces 145 which are used, as will presently be seen, to selectively position a desired type element 144 at the printing station above platen 112. In normal position, the sectors are urged counterclockwise against a bail 146 fastened to a bail link 147 which is fixed to shaft 143, by means of springs 148 extending between the sectors and a stud 149 fastened between the front and back plates. It may be seen, then, that during the rotation of main cam shaft 56, the link 140 and cam member 142 will rotate shaft 143, bail link 147 and the sectors 115 and 116 first in a counterclockwise direction and then in a clockwise direction, the ratchet portions having tooth spaces 145 moving through slots in a guide plate 150 fastened between the front and rear plates.

The mechanism for selectively positioning the sectors for printing comprises latch levers 155, one for each sector, pivotally mounted on a shaft 156 journaled in the front and the back plates. The levers are positioned along the shaft 156 by a comb member 157 so that the hooked end 158 of each one can act on the ratchet teeth of a corresponding sector. They are normally urged in a clockwise direction for engagement with the ratchet teeth in the sectors by springs 159 extending between the levers and a stud 160 fastened between the front and intermediate plates. The latch levers 155 have downwardly extending portions 161 of varying lengths which are notched at the bottom and which are each normally latched against related armatures 162 of latch magnets LM mounted in staggered relationship. In the latched position, as shown in Fig. 5, the hooked ends 158 of the latch levers 155 are clear of the ratchet teeth in the print sectors due to the engagement of the armatures 162 and related extended portions 161.

Fastened on the shaft 156 is an arm 163 having a stud 164 which rides in a cam slot 165 in the cam member 142. The cam slot 165 is arranged so that the oscillation of shaft 143 and the cam member 142 is imparted to shaft 156 through arm 163. Also fastened on the shaft 156 is a bell crank lever 166, the lower arm of which has fastened thereto a stud 167 which extends underneath all of the latch levers 155. The upper arm of bell crank lever 166 extends through a slot in top plate 129 and is used to actuate a ribbon feed mechanism.

The operation of the selector mechanism is under control of a circuit breaker cam 168 fastened on shaft 143 and having a series of nine lobes on its periphery which function to open and close a pair of associated circuit breaker contacts mounted in a conventional circuit breaker unit CB3 attached to the front plate. As will be more clearly understood in connection with the circuit description of the toll recorder, the counters in the machine receive manually-settable axle-count pulses and axle treadle pulses. When the toll recorder is conditioned to take a print cycle, the main cam shaft 56 will make one revolution, as previously described, during which time the sector shaft 143 will be driven first in a counterclockwise direction (Fig. 4) and then in a clockwise direction through the driving link 140 and the cam member 142. As shaft 143 moves counterclockwise, the bail link 147, print sectors 115 and 116 and circuit breaker cam 168 will also move counterclockwise with the circuit breaker cam closing cam contacts CB3 to direct impulses to a counter in the toll recorder. Each sector will continue to follow the bail link 147 until its related latch magnet LM receives an impulse from the related counter, which occurs when the said counter reaches zero, as will be shown later in connection with the circuit diagram. Energization of a latch magnet LM will draw the related magnet armature 162 downwardly to thereupon unlatch the latch lever 155. Latch lever 155 will then be spring moved clockwise into engagement with the proper notch in the related sector ratchet thereby stopping further movement of the sector with bail 146. Hence, the type element 144 in position for printing will represent the number which had been stored in the corresponding counter, as will appear more clearly when the circuit diagram is described.

It will be noted that as cam member 142 moves counterclockwise, arm 163 will cause shaft 156 to rotate clockwise carrying with it bell crank lever 166. As a result, stud 167 on bell crank lever 166 is moved away from the latch levers 155 leaving them free to be pivoted into engagement with the ratchet sectors. A slotted guide bracket 169 is fastened between the front and intermediate plates to guide the lower portions 161 of latch levers 155.

After the bail link 147 reaches the limit of its counterclockwise movement and all of the sectors have been positioned, the printing hammer 109 is tripped off, as previously described, and a recording is made. Any of the sector plates that were not required to be stopped by the latch levers 155 will be stopped by projecting fingers 170 on a stop bracket 171 fastened to the front plate 126. At the end of the printing cycle, the complementary cams 134 and 135 will cause the sector shaft 143 to commence rotating in a clockwise direction. As cam member 142 begins to rotate clockwise, arm 163 will pivot shaft 156 counterclockwise and the stud 167 on bell crank lever 166 will lift all of the latch levers clear of the ratchet teeth on the print sectors. The bail link 147 will restore all of the sector plates back to their home position and the shaft 143 will carry the circuit breaker cam 168 back to its home position. The extended portions 161 of latch levers 155 are latched back on the armatures 162 of the latch magnets LM levers 155 are pivoted clear of the ratchet teeth in the sectors.

*Axle select lever print mechanism*

As described previously, the toll collector manually sets up an axle count in axle unit 13 (Fig. 1). This unit includes an axle select lever (not shown) which is mounted for movement on front wall 132 (see also Fig. 5), the said lever being manually set by the toll collector to correspond with the number of axles on the vehicle being checked. As described fully in the aforementioned copending U. S. patent application, the said lever may be set to any position A, and 1 through 7.

This lever is used to position a print sector somewhat similar to sector 116 shown in Fig. 5, so that the type element thereon selected for printing corresponds to the corresponding selected position A through 7. Whenever the toll collector on duty processes a tour-of-duty card at the beginning and at the end of a tour-of-duty, or shifts the card receiver from one position to another, the aforementioned lever is set to position A. This lever is set to the same position whenever a tour-of-duty card is inserted into the card receiver of the toll recorder prior to shifting the card receiver from one position to the other. Whenever the said lever is set to position A, cam contacts CB4 (see also Fig. 6) are not operated to control count impulses to the axle control accumulator.

In a normal vehicle trip card processing operation, the aforesaid lever is set to a position corresponding to the number of axles determined to be carried by the vehicle being checked by the toll collector. For example, if it is determined that such a vehicle has three axles, this lever is set to position 3 in order to move the print sector controlled thereby to a position whereat the type element for printing a three in the axle selected column 20 (see also Fig. 4) is at the printing station. Subsequent operation of the toll recorder causes operation of cam contacts CB4 whereby a number of impulses equal to the tens complement of the axle count represented by the position of the said lever, is transmitted. That is, assuming the lever to be set to position 3, seven impulses are directed from cam contact CB4 to the axle control accumulator.

Card receiver shift mechanism

As is shown in Fig. 6, the card receiver 70 may be moved to the left so as to be in the exit position, or to the right so as to be in the entrance position. The card receiver includes a bed 71 which is positioned on two horizontal guide rails 72 and 73 for movement therealong. Attached to the bed is a bracket 74 having two recesses therein, each adapted to accept a spring urged detent ball 75. As is shown, the ball acts to detent the card receiver in whatever position the latter is placed.

The card receiver causes contacts 77a and 77b (represented as 77 in Fig. 6) to close whenever the receiver is set to an exit position, and contacts 76a and 76b (represented as 76 in Fig. 6) to close whenever the receiver is set to an entrance position. The contacts are so adjusted that both sets of contacts are opened simultaneously during the time the card receiver is being shifted from one position to the other. The purpose of the contacts will be described in detail hereinafter in the Circuit Description.

Operational circuits

Figure 7A:
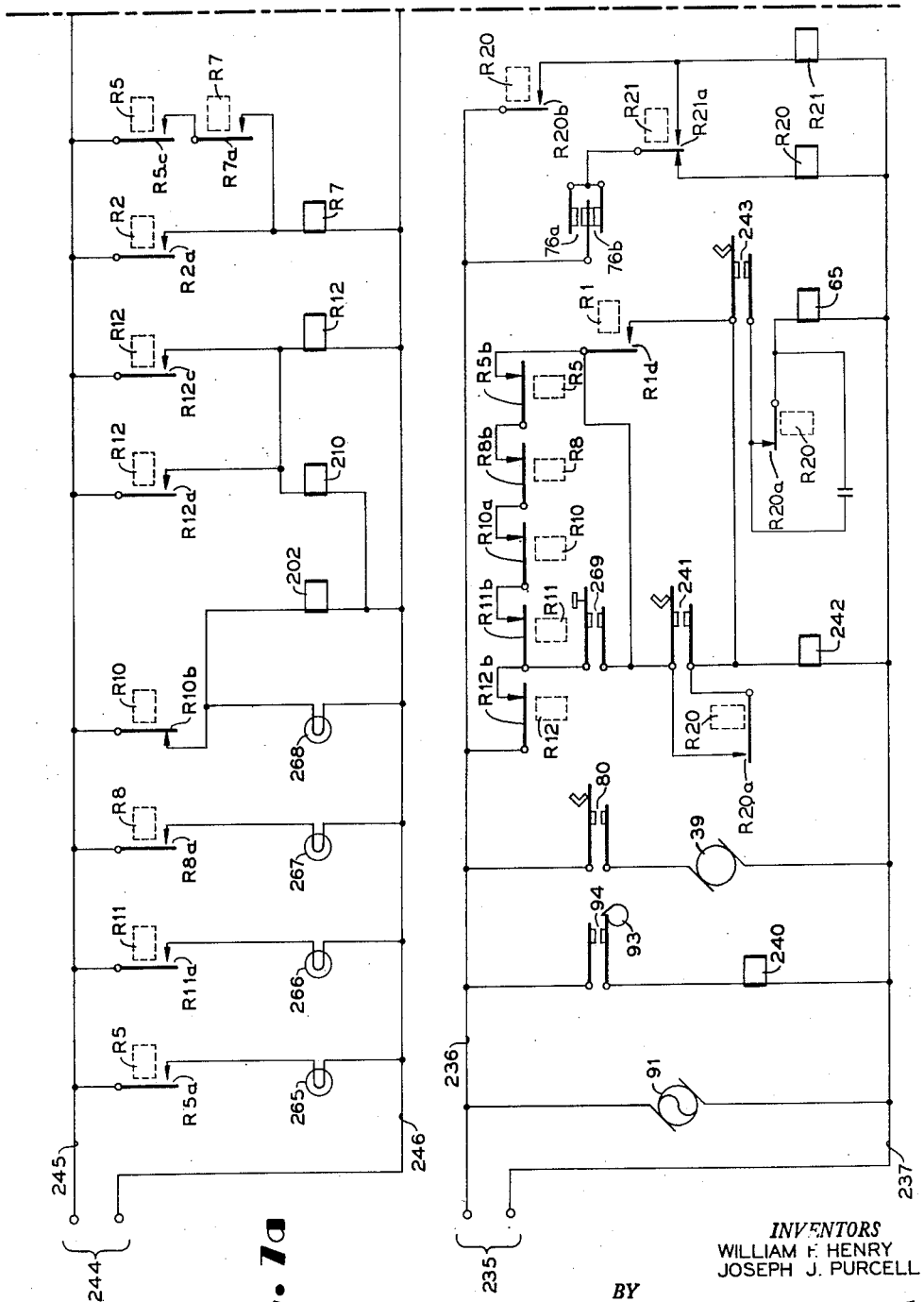

*General description.*—Referring to Fig. 7a, suitable electrical power, e. g., 115 volts, is directed from source 235 to lines 236 and 237. Similarly, direct current power, e. g., 48 volts, is directed from source 244 to lines 245 and 246.

As is shown, synchronous timing motor 91 is operated continuously so long as the toll recorder is connected to source 235, and thereby causes a cam 93 connected to the shaft thereof, to rotate at a speed of one revolution per minute. Accordingly, cam contacts 94 are closed once each minute to complete a circuit to time control solenoid 240. This solenoid which is represented as solenoid 40 in Fig. 3 of Rast Patent No. 2,281,998, which issued on May 5, 1942, operates a clutching means to connect a drive motor to a time indicating type wheel unit for printing the time in column 18 (Fig. 4) of the trip card. The type wheel unit consists of a minute wheel, an hour wheel and an AM-PM wheel, each of these wheels being advanced at the proper time. Inasmuch as the time apparatus is described in detail in the afore-mentioned Rast patent, and since this apparatus is not an essential feature of the instant invention, the said apparatus will not be described herein any further so as to avoid undue complexity and prolixity.

Referring to Fig. 7a once again, insertion of a trip card into the card receiver of the toll recorder engages a card lever which closes card contacts 241 so as to complete a circuit to card hold solenoid 242 from line 236 through relay contacts R12b, R11b, R10a, R8b, R5b, card contacts 241, card hold solenoid 242, to the other side of the line. energization of solenoid 242 operates a card hold lever (not shown) for gripping the trip card so that the latter cannot be removed from the card receiver until after the card processing operation is completed. Solenoid 242 also closes contacts 243 through a suitable mechanical means (not shown) so as to energize main drive clutch solenoid 65. This sequence of operation assures the proper insertion and retention of the trip card in the card receiver prior to the start of the recorder print cycle. As described hereinbefore, energization of clutch magnet 65 causes a single toll recorder print operation to take place.

Figure 7B:
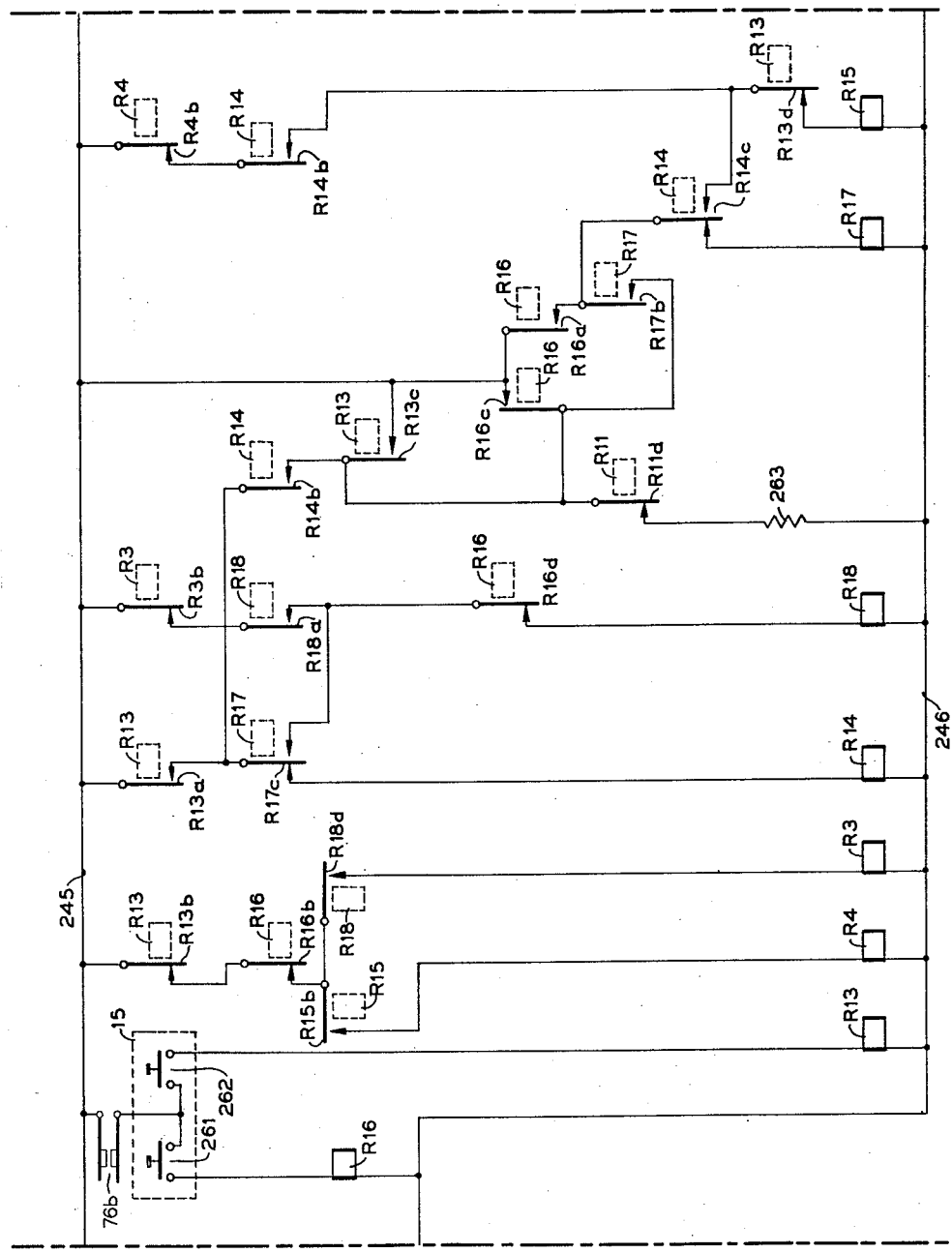
Figure 7C:
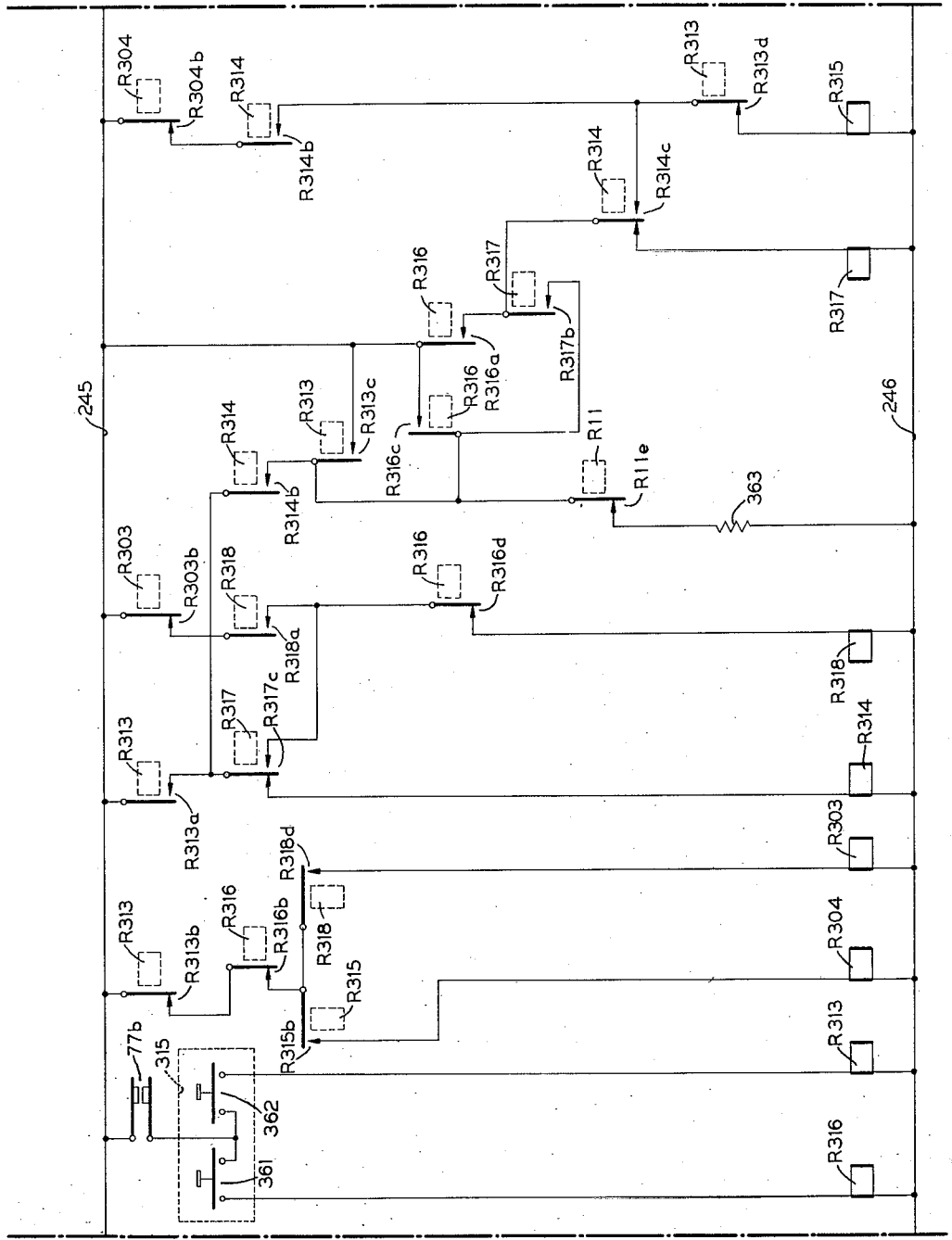
Figure 7D:
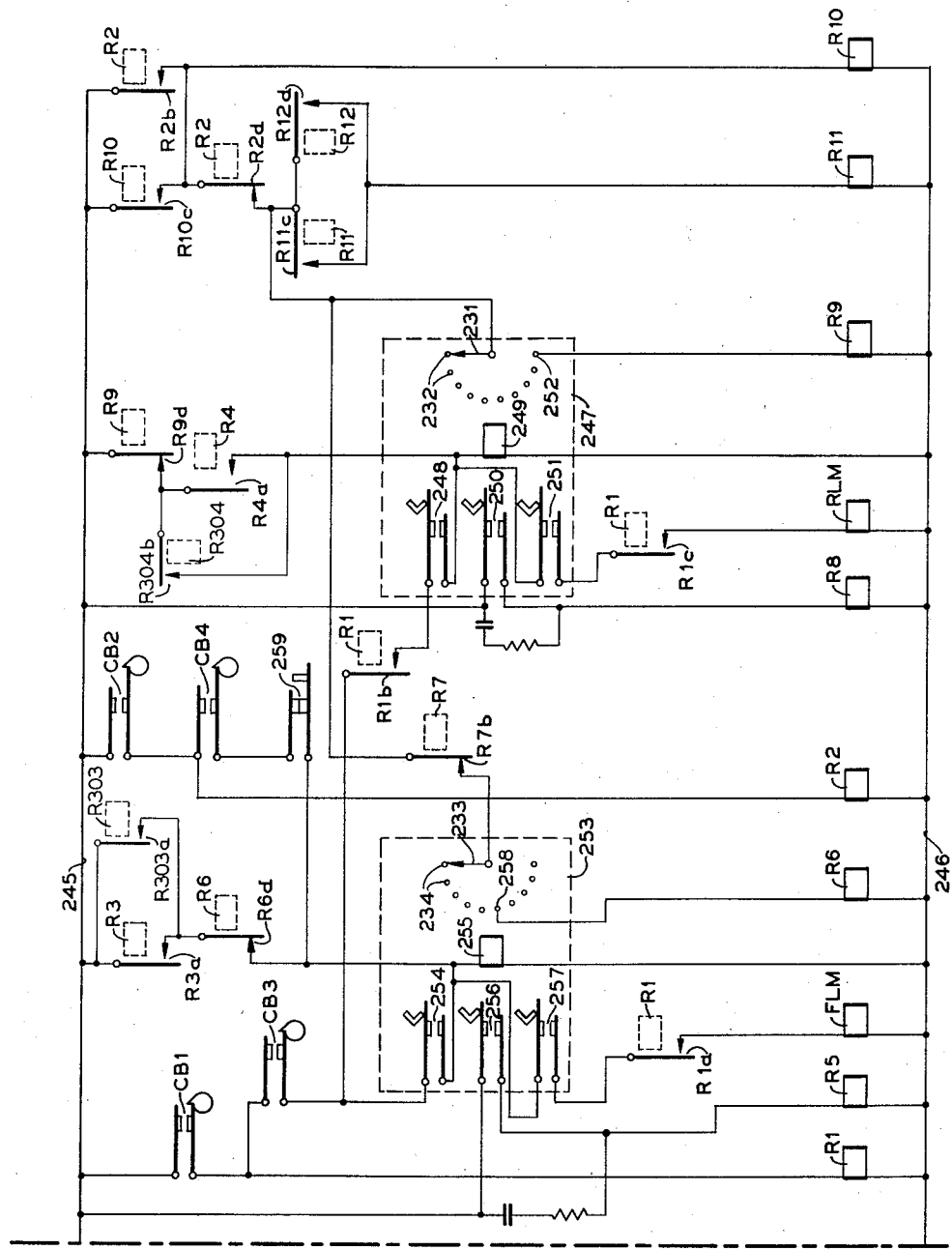

*Forward counter operation.*—Referring to Figs. 7b and 7d, when a wheel attached to an axle passes over treadle 15 (see also Fig. 1) in a forward direction, forward contacts 261 and reverse contacts 262 are closed and opened in succession to thereupon enter a single axle count into forward axle counter 253. As will be described shortly, in order to enter an axle count into this counter, it is necessary for contacts 261 to close first, contacts 262 to close before contacts 261 open, and contacts 262 to open last.

Assuming a single axle of a vehicle is passing over the treadle in a forward direction, forward contacts 261 are closed first to complete a circuit to relay R16 (Fig. 7b). The energization of relay R16 causes a circuit to be completed to relay R17 from line 245 through contacts R16a, R14c normally closed (n/c), relay R17, to line 246. This causes a hold circuit for relay R17 to form from line 245 through contacts R16c, R17b and R14c n/c.

Relay R13 is energized when reverse contacts 262 in treadle 15 are closed. The closing of contacts R13c completes a second hold circuit for relay R17 from line 245 through contacts R13c, R17b and R14c n/c. It is to be observed that had relay R16 been de-energized prior to the energization of relay R13, relay R17 would have been de-energized when the hold circuit therefor including contacts R16c, opened.

Further movement of the vehicle in a forward direction permits contacts 261 to open so as to cause relay R16 to de-energize. This allows a circuit to form to energize relay R18 from line 245 through contacts R13a R17c normally open (n/o), R16d, relay R18, to the other side of the line. A hold circuit is immediately formed from line 245 through contacts R3b, R18a and R16d.

The complete passage of the vehicle over the treadle in a forward direction allows contacts 262 to open after forward contacts 261 have opened, to thereupon effect de-energization of relay R13. Hence, relay R3 is energized from line 245 through contacts R13b, R16b, R18d, relay R3, to line 246. This causes contacts R3b to open, whereupon the hold circuit to relay R18 is disrupted, and the latter relay is caused to drop out. This action, in turn, causes contacts R18d to open so as to de-energize relay R3.

Referring to Fig. 7d, it may be seen that forward counter magnet 255 is pulsed once when contacts R3a are caused to close; that is, a circuit is completed from line 245 through contacts R3a, R6d, magnet 255, to the other side of the line.

Forward and reverse counters 253 and 247, respectively, each are of the step-by-step operated type described in Lake et al. Patent No. 2,480,744, which issued on August 30, 1949. The counters used in the instant embodiment are somewhat modified versions of the Lake accumulator. For example, a spring is used to return the armature (armature 23 in Fig. 1 of the Lake patent) instead of a magnet (magnet 22 in Fig. 1 of the Lake patent). However, in view of the fact that the counters used in the toll recorder are substantially the same as the one described in the Lake patent, and since the counters per se are not a feature of this invention, they will be described only briefly herein.

Referring to forward counter 253 shown in Fig. 7d, each time magnet 255 is impulsed, emitter arm 233 is caused to move in a counterclockwise direction from one commutator segment 234 to the next. Also, when arm 233 engages segment 258, a count of five axles is indicated in counter 253.

Similarly, every time magnet 249 is impulsed, emitter arm 231 is moved in a counterclockwise direction from one commutator segment 232 to the next segment. When arm 231 engages segment 252, a count of nine axles in the reverse direction is indicated in reverse counter 247.

Each counter includes three cams which move in step with the emitter arms 231 and 233 as the counters are advanced step-by-step. These cams operate upon contacts 254, 256 and 257 in counter 253, and upon contacts 248, 250 and 251 in reverse counter 247. The arrangement is such that contacts 248, 251, 254 and 256 are open only when their respective counters 247 and 253 are standing at zero. Contacts 250 and 255, on the other hand, are closed only when the related counters stand at nine.

*Reverse counter operation.*—Provision is made in the subject toll recorder to also count axles passing over treadle 15 in a reverse direction. That is, a single reverse axle count is entered in reverse counter 247 in response to each axle wheel causing contacts 262 (Fig. 7b) and 261 to close and open in succession.

Relay R13 is energized first when contacts 262 are closed. This causes a circuit to be completed to relay R14 from line 245 through contacts R13a and R17c n/c. A separate hold circuit is then completed from line 245 through contacts R13c, R14 and R17c n/c.

Further movement of the vehicle in a reverse direction closes contacts 261 to thereby complete a circuit to relay R16. Relay R16 being energized prior to R13 becoming de-energized causes a second hold circuit to relay R14 to be completed from line 245 through contacts R16c, R14b, and R17c n/c. Upon the de-energization of relay R13 when treadle contacts 262 are caused to open, a circuit is completed to relay R15 from line 245 through contacts R16a, R14c n/o and R13d. A parallel hold circuit is completed from line 245 through contacts R4b, R14b and R13d. When the vehicle is moved in a reverse direction so as to be completely off treadle 15, relay R16 is de-energized due to contacts 261 being allowed to open. The de-energization of relay R16 causes a circuit to be completed to relay R4 from line 245 through contacts R13b, R16b and R15b. Hence, referring to Fig. 7d, reverse counter magnet 249 is impulsed to add a count of one when contacts R4a close, through a circuit from line 245 contacts R9d and R4a, magnet 249, to the other side of the line.

Referring once again to Fig. 7b, the energization of relay R4 causes the de-energization of relay R15 when contacts R4b open. In turn, the de-energization of relay R15 causes the de-energization of relay R4 when contacts R15b open.

*Second treadle circuit.*—The treadle circuit shown in Fig. 7c for treadle 315 (see also Fig. 1), is similar in all respects to the treadle circuit shown in Fig. 7b and described hereinabove. It is to be observed that corresponding elements in Fig. 7c have corresponding reference numerals in the 300 series to thereby associate those elements with corresponding ones in Fig. 7b.

Inasmuch as the directional treadle circuit was described with reference to Fig. 7b, the relay circuit shown in Fig. 7c will be described only briefly so as to avoid undue prolixity. Assuming a vehicle axle to pass over treadle 315 in a forward direction, contacts 361 are closed first to energize relay R316. The energization of relay R316 causes relay R317 to energize via contacts R316a. Continued movement of the vehicle over treadle 315 causes relay R313 to energize when contacts 362 are closed, and continued vehicular movement causes contacts 361 to open whereby relay R316 is de-energized. Hence, relay R318 is energized via contacts R313a, R317c n/o and R316d. Still continued movement of the vehicle treadle 315 causes contacts 362 to open whereupon relay R313 is de-energized. As a result, relay R303 is energized via contacts R313b, R316b, and R318d. The energization of relay R303 causes the de-energization of relay R318 when contacts R303b open, the energization of relay R318 causing the de-energization of relay R303 when contacts R318d open. As is shown in Fig. 7b, contacts R303a are connected in parallel circuit with contacts R3a, and serve the same purpose as the latter contacts.

A vehicle passing over treadle 315 (Fig. 7c) in a reverse direction will cause contacts 362 to close first so as to energize relay R313. This causes the energization of relay R314 when contacts R313a close. Continued movement of the vehicle over the treadle causes relay R316 to become energized when contacts 361 are closed, the simultaneous energization of relays R313, R314 and R316 provide means to energize relay R317 via contacts R304b, R314b, and R314c n/o. Continued vehicular movement over treadle 315 causes the opening of contact 362 whereupon relay R313 is de-energized and relay R315 is energized via contacts R313d. When the vehicle finally passes over the treadle in a reverse direction so as to open contacts 361 and thereupon cause relay R316 to de-energize, relay R303 is energized via contacts R313b, R316b and R318b. The energization of relay R303 causes the de-energization of relay R318 when contacts R303b open, and the energization of the latter relay causes the de-energization of relay R303 when contacts R318d open.

As is shown in Fig. 7d, contacts 304a are connected in parallel circuit with, and serve the same purpose as, contacts R4a.

*Normal toll recorder operation.*—As mentioned hereinbefore, the axle selection lever (not shown) is set by the toll collector who is checking the vehicle stopped opposite toll booth 12, to a position indicating the number of vehicle axles on the vehicle. After so setting the lever in axle unit 13, a trip card is inserted into the card receiver of the toll recorder to cause drive motor 39 (see Figs. 5 and 7a) to operate the drive mechanism described previously.

During the first half of the recorder cycle, cam contacts CB1 close from 5° to 160° so that reset cam CB3 directs nine equally spaced reset impulses of equal duration to forward counter 253. Inasmuch as cam contacts CB1 are closed from 5° to 160°, cam contacts CB3 are effective only during the counterclockwise movement of the variable cam associated with the print sector. Since contacts 254 (Fig. 7d) are open only when counter 253 is standing at zero, the afore-mentioned reset pulses will be directed to counter magnet 255 only if forward counter 253 contains a value other than zero, and through a reset circuit including line 245, contacts CB1, CB3, R1b, tens contact 248, magnet 249, and the other side of the line. Assuming, for example, counter 253 to contain a two-axle count from the previous toll recorder operation, 8 reset impulses will be directed to magnet 255 before contacts 254 are caused to open the reset circuit.

It may be seen that the same reset impulses are directed to reverse counter magnet 249 from line 245 through contacts CB1, CB3, R1b, tens contacts 248, magnet 249, to line 246. Contacts R1b are closed from 5° to 160° because relay R1 is controlled by cam contacts CB1. As with counter 253, contacts 248 are caused to open when counter 247 is standing at zero.

Assuming counter 253 to contain a zero axle count from the previous toll recorder operation, magnet 255 will not be energized due to the reset impulses due to the fact that contacts 254 are open. Hence, the print sector 116 (see also Fig. 5) associated with counter 253 will follow bail 146 to the limit of movement in a counterclockwise direction, whereby the last, i. e., the zero, type element 144 is at the printing station. Similarly, assuming a zero axle count in reverse counter 247, magnet 249 thereof is not energized by the reset impulses due to open contacts 248. Accordingly, type sector 116 associated with counter 247 will move to the limit of movement in a counterclockwise direction to thereby align the zero type segment with the platen.

At substantially the mid-point of the print cycle, a print stroke is effected whereby, among other items of information, a zero is printed in reverse axles column 21 (see Fig. 4), a zero axle count is printed in error axles column 22, and the axle count of the vehicle at the toll booth is printed in axles column 20 from the type sector which is set mechanically by the axle selction lever.

After printing the afore-mentioned information upon the trip card, cam contacts CB4 direct a number of impulses to forward counter magnet 255, wherein the so-called subtractive impulses equal the tens complement of the number to which the axle selection lever 175 is set. That is, assuming the axle selection lever to be set in the two axle position, eight impulses are directed from line 245 through contacts CB2, CB4, tour-of-duty contacts 259, magnet 255, to line 246. Inasmuch as cam contacts CB2 are open during the first half of the toll recorder cycle when variable cam 177 is caused to move in a counterclockwise direction, cam contacts CB4 are ineffective. Contacts CB4 are effective during the second half of the toll recorder cycle when variable cam 177 is moved in a clockwise direction because cam contacts CB2 are closed from 200° to 355°.

As the vehicle leaves the toll booth, each axle crossing the treadle in a forward direction causes an impulse to be directed through the directional relay circuit described hereinbefore to thereby energize forward counter magnet 255. If the toll collector set the axle selection lever in a position indicative of the correct number of axles on the vehicle, the axle counts directed to forward counter 253 during the time that the vehicle is passing over the axle treadle should return the counter to zero.

As a result, when the next vehicle arrives at the toll booth, a zero will be printed in the error and reverse columns 22 and 21, respectively, of the trip card.

*Reverse axles count.*—As described hereinabove, axles crossing the treadle in a reverse direction will be counted by reverse counter 247. Any count appearing in the reverse counter will be printed on the trip card during the toll recorder cycle that the counter is returned to zero. This operation is similar to the forward counter operation. Assuming that a two axle vehicle passed over the treadle in a forward direction prior to passing over the treadle in a reverse direction, relay R4 will be energized twice, whereupon two impulses will be directed to reverse counter magnet 249. Thus, during the first half of a print cycle, reset impulses will be directed through contacts CB3 and R1b and 248 to magnet 249 so as to advance the counter to zero. However, at the time the counter is standing at 9, contacts 251 are closed so as to complete a circuit to latch magnet RLM from line 245 through contacts CB1, CB3, R1b, 248, 251, R1c, magnet RLM, to the other side of the line. Referring to Fig. 4, as described previously, the energization of latch magnet RLM will release latch lever 155 associated therewith so that projection 158 thereon will engage a notch 145 of type sector 116 to thereby align the two type segment 144 with platen 112.

Of course, during the toll recorder cycles, when there is no count in the reverse counter, contacts 248 will be open and type segment 116 will be permitted to move in a counterclockwise direction so as to align the type segment 144 with platen 112.

*Forward axle error operation.*—Assuming that the toll collector sets the axle selection lever to a two axle position for a vehicle having three axles, a count of eight will be entered into counter 253 during the toll recorder cycle in which the trip card associated with the vehicle is processed. When the vehicle is permitted to leave the booth to pass over the treadle in a forward direction, the afore-described treadle circuit will direct three impulses to forward counter magnet 255. Hence, the counter will advance through zero to a one. During the following toll recorder operation for the next vehicle arriving at the toll booth, nine reset impulses will be directed through cam contacts CB3 and tens contacts 254 to reset the counter from a one to a zero. The eight impulse advances the counter to a nine, of course, at which time the contacts 257 are caused to close so as to energize latch magnet FLM from line 245 through contacts CB1, CB3, 254, 257, R1a, magnet FLM, to line 246. In view of the fact that the type sector 116 (see also Fig. 5) which prints in the error column of the trip card and which is associated with forward counter 253, moves in unison with the reset impulse cam for controlling contacts CB3, this type sector is stopped by a latch lever 155 when latch magnet FLM is energized to align the "—1" type symbol 144 with the platen. Hence, a "—1" will be printed on the trip card in error column 22 (Fig. 4) to indicate that the axle selection lever was set to a number of axles fewer than the actual number determined by the treadle.

Assuming that the toll collector has set the axle selection lever to a three axle position for a vehicle having two axles, the counter will stand at a nine after the vehicle crosses the treadle in a forward direction. This, of course, is due to the seven reset impulses directed through cam contacts CB4 and two treadle counts. Hence, during the following toll recorder cycle, the first reset impulse directed through cam contacts CB3 will energize latch magnet FLM as well as counter magnet 255. This will release latch lever 155 to align the first type segment 144 with the platen to print a "+1." The plus error will indicate that the axle selection lever was set to a number of axles greater than the actual number passing over the treadle.

*Ten-axle control.*—It may be observed that the entry of ten axle counts or any multiple of ten axles, into either the forward counter 253 or the reverse counter 247 will return the counter to zero. Consequently, fraudulent acts could normally be precipitated quite easily. To prevent any fraudulent acts of this type, a ten-axle control feature is provided to indicate and record an attempt to enter a ten or greater axle count into either the forward or reverse counters. This is accomplished by providing for only a maximum five axle count to be entered in forward counter 253, and only a maximum nine axle count to be entered into reverse counter 247. Thus, if the unauthorized operation of the treadle circuit by vehicles passing the toll booth without having trip cards processed, advances the forward counter to at least a maximum of five axles, or the reverse counter to at least a maximum of nine axles, a tens-axle error will be detected and recorded. The maximum axle counts, i. e., fixe or nine, will remain in the respective counters until the first toll recorder operation following their entry. During this operation, a five will be printed in error column 22 (Fig. 4) and a nine will be printed in reverse column 21.

Axles crossing the treadle in a forward direction will cause relay R3 to become energized once for each axle. Thus, an impulse for each forward axle will be directed to magnet 255 when contacts R3a close. When the axle bringing the counter to a five passes over the treadle, emitter arm 233 is caused to engage commutator segment 258. This completes a circuit to relay R6 from line 245 through contacts R2d, R7b, emitter arm 233 and segment 258, relay R6, to the other side of the line. This causes the circuit to counter magnet 255 to be interrupted when normally closed contacts R6d are open. Thus, any additional axles crossing the treadle will not be counted.

When the next trip card is inserted in the card receiver of the toll recorder so as to initiate a toll recorder operation, a five will be printed in the error column of the trip card. This will indicate either a legitimate error of five axles or an attempted fraud caused by vehicles passing the treadle in a forward direction.

During normal operation of the toll recorder when the axle selection lever is set to the two, three or four axle positions, impulses directed through contacts CB4 will cause the counter 253 to advance past the five position.

The ten-axle control circuit is ineffective during this part of the toll recorder cycle because relay R2 is energized from 200° to 355° while contacts CB2 are closed. This causes contacts R2d to open, and to thereby prevent a circuit to form to relay R6.

Relay R7 (Fig. 7a) is also energized when relay R2 is energized, and is maintained energized as long as there is a count in forward counter 253. Relay R7 is energized through contacts R2a. Relay R7 is maintained energized through contacts R5c and R7a. Referring to Fig. 7c, contacts 256 are caused to open only when counter 253 is at zero. As a result, relay R5 is energized so long as counter 253 is not standing at zero. The circuit for relay R5 is from line 245, contacts 256, relay R5, to line 246. Since counter 253 does not have a zero until after the vehicle has passed over the treadle (during normal operation) the circuit to relay R6 is inoperative until after the vehicle has completely crossed the treadle.

In the event that nine or more axles are caused to pass over the treadle in a reverse direction, emitter arm 231 (Fig. 7b) is caused to engage commutator segment 252 when the ninth axle count is entered into reverse axle counter 247. This causes a circuit to be completed to relay R9 from line 245 through contacts R2d, arm 231, and segment 252, relay R9 to the other side of the line. This, in turn, causes contacts R9d to open the circuit to counter magnet 249 so that no additional magnet counts are entered into counter 247.

When the next trip card is inserted into the card receiver of the toll recorder, a nine will be printed in the reverse error column 21 (see Fig. 4). This will indicate either a legitimate number of nine axles passing over the treadle in a reverse direction or an attempted fraud by several vehicles passing over the treadle in this direction.

*Power failure circuit.*—The toll recorder will indicate a power failure by causing a character P to be printed in column 23 of the trip card (see Fig. 4) during the first toll recorder operation effected after the power failure.

When the power applied to lines 245 and 246 is interrupted, relay R10 (Fig. 7c) is de-energized. When the power is restored to the aforesaid lines, a circuit is completed to magnet 202 (Fig. 7a) through contacts R10b. Energization of magnet 202 effects a movement of a type sector so that the type symbol thereon having a P configuration is brought into alignment with the printing platen. During the toll recorder printing stroke, the type sector will be restored to its home position after printing a P, and relay R10 (Fig. 7c) will be energized during the second half of the toll recorder cycle when contacts R2d are closed. Relay R10 will remain energized through its stick contacts R10c as long as power is maintained on lines 245 and 246.

*Treadle time delay circuits.*—The purpose of the treadle time delay circuit is to afford means for indicating when the treadle contacts 261, 262, 361 and 362 have been held closed for a period longer than a predetermined time. This is a safeguard against what is commonly referred to as "sandbagging" the treadle. Referring to Fig. 7b, the energization of relays R16 and/or R13 completes a circuit to a heating coil resistor 263 from line 245 through contacts R16c and R11d, and/or contacts R13c, R11d, heater resistor 263, to the other side of the line. Resistor 263 is arranged on a bi-metal contact strap R12c (see also Fig. 7a). The bi-metal contact R12c is caused to close as a result of a continuous current for a predetermined time through heater coil resistor 263. The length of time required to close the contact is adjustable from approximately five seconds to twenty seconds.

Referring to Fig. 7c, the energization of relays R316 and/or R313 completes a circuit to a heating coil resistor 363 from line 245 through contacts R316c and R311d, and/or contacts R313c, R311d, heater resistor 363, to the other side of the line. Resistor 363 is arranged on the bi-metal contact strap R12c along with resistor 263, and is used to accomplish the same result as resistor 263.

When contacts R12c are closed, relay R12 and magnet 210 are energized therethrough, and are maintained energized through contacts R12a. The energization of magnet 210 causes a sector to be moved so that the type segment thereon having a T configuration, is brought into alignment with the printing platen. Relay R11 is energized when relay R12 is energized, from line 245 through contacts R2d, R12d, relay R11, to line 246. Relay R11 is maintained energized by hold circuit from line 245, through contacts R2d, R11c, relay R11, to line 246. This causes contacts R11d (Fig. 7b) and R11e (Fig. 7c), to open in order to interrupt the circuit to resistors 263 and 363, respectively, so as to prevent the possibility of overheating or burning the resistors.

*Indicating light circuits.*—Referring to Fig. 7a, light 265 is lit as long as relay R5 (see also Fig. 7d) is energized. Since relay R5 is energized as long as counter 253 does not contain a zero, light 265 indicates the same when energized.

In view of the fact that light 266 is energized when contacts R11a are closed, and since relay R11 (see also Fig. 7d) is energized in consequence of a treadle time delay, light 266 is to indicate a treadle time delay.

The purpose of light 267 is similar to that for 265 in that light 267 is lit whenever reverse counter 247 is standing at a value other than zero. It will be recalled that relay R8 is energized through contacts 250 whenever counter 247 is at a value other than zero.

Light 268 is energized whenever relay R10 is de-energized. Consequently, as explained hereinabove, light 268 is lit after a power failure and prior to the first toll recorder operation after the said failure.

*Start control circuit.*—Full insertion of a trip card into the card receiver of a toll recorder will cause contacts 241 to close as described previously. However, a toll recorder operation may not be effected automatically for the following reasons:

(1) Contacts R5b (Fig. 7a) when open indicate that forward counter 253 (see also Fig. 7d) contains a value other than zero.

(2) Contacts R8b when open indicate that reverse counter 247 contains a value other than zero.

(3) Contacts R10a when open indicate that a power failure has occurred.

(4) Contacts R11b when open indicate that a weight is on the treadle causing contacts 261 (see also Fig. 7b) and/or 262 to close after a predetermined time interval.

(5) Contacts R12b when open indicate that the bi-metal contacts R12c are closed and are causing the energization of relay R12.

Hence, whenever one or more contacts R5b, R8b, R10a and R11b are open, it is necessary to depress error switch 269 so as to close the contacts thereof in order to complete a circuit to solenoid 242 from line 236 through contacts R12b, 269, 241, solenoid 242, to the other side of the line. However, if contacts R12b are open due to the fact that the bi-metal contact strap has not cooled sufficiently to open the circuit to relay R12 and magnet 210, depression of error switch 269 will not complete a circuit to solenoid 242 until after contacts R12b close.

Whenever the card receiver of the toll recorder is shifted from one position to the other, there is a period during which contacts 76 and 77 (see also Fig. 6) are open concurrently. This causes the de-energization of relay R21. When either set of contacts 76a or 77a is caused to close, relay R20 is energized from line 236 through contacts 76a or 77a, R21a n/c, relay R20 to the other side of the line. The energization of relay R20 causes contacts R20b to close whereupon relay R21 is energized, and is held energized via contacts R21a n/o. The transfer of contacts R21a causes the de-energization of relay R20. Contacts R20a, when opened momentarily, cause clutch magnet 65 to de-energize momentarily. Upon the re-energization of magnet 65 inasmuch as contacts 243 are still closed, another recorder cycle will occur. As is mentioned previously, and as is described in copending application Serial No. 398,358, one continuous energization of magnet 65 will cause only one recorder operation. Since the tour-of-duty card remains in the card receiver, contacts R20a provide the necessary break so as to afford two recorder operations.

Referring to Figs. 7b and 7c, it may be seen that only one treadle at a time may be rendered active due to contacts 76b and 77b being closed to connect their respective treadles 15 and 315, and line 245.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A toll highway recorder for recording on a record data relating to vehicular ingress to and egress from the toll highway comprising an In-axle treadle positioned in a toll highway entrance lane; an Out-axle treadle positioned in a toll highway exit lane; data recording means; a record receiver for holding the record in a recording position; first circuit means adapted to operatively connect said In-treadle and said data recording means; second circuit means adapted to operatively connect said Out-treadle and said data recording means; a first pair of contacts; a second pair of contacts; manually operable means for shifting said receiver to an In-position so as to operate said first pair of contacts, and to an Out-position so as to operate said second pair of contacts; and switching means controlled by said first and said second pair of contacts for governing said first and said second circuit means so that said data recording means is operatively connected to the one of said axle treadles corresponding to the position of said card receiver.

2. A toll highway recorder for recording on a record data relating to vehicular ingress to and egress from the toll highway comprising an In-axle treadle positioned in a toll highway entrance lane; an Out-axle treadle positioned in a toll highway exit lane; data recording means; a record receiver for holding the record in a recording position; first circuit means adapted to operatively connect said In-treadle and said data recording means; second circuit means adapted to operatively connect said Out-treadle and said data recording means; a pair of electrical contacts; manually operable means for shifting said receiver to an In-position so as to close said contacts, and to an Out-position so as to open said contacts; and switching means controlled by said contacts for governing said first and said second circuit means so that said data recording means is operatively connected to the one of said axle treadles corresponding to the position of said record receiver.

3. A toll highway recorder according to claim 2 additionally comprising a sequence operation impulse accumulator; an impulse transmitting means; and means governed by said contacts for causing said transmitting means to transmit a single impulse to said accumulator in response to said record receiver being shifted from one position to another position.

4. In a toll highway recorder for recording data on a record, said data relating to vehicular ingress to and egress from the toll highway, the combination of In-axle treadle positioned in a toll highway entrance lane for detecting forward and reverse axles in an entrance direction, an Out-axle treadle positioned in a toll highway exit lane for detecting forward and reverse axles in an exit direction, data recording means, a record receiver for holding the record in a recording position, manually operable means for shifting said receiver to an In-position and to an Out-position, first circuit means adapted to operatively connect said In-treadle and said data recording means whereby forward and reverse entrance direction axle counts are directed to said recording means, second circuit means adapted to operatively connect said Out-treadle and said data recording means whereby forward and reverse exit direction axle counts are directed to said data recording means, a counter for accumulating a toll recorder operation sequence count, means for effecting a toll recorder operation, means operative during a toll recorder operation to cause a sequence count to be added to said counter, switching means controlled by said manually operable means for governing said first and said second circuit means so that said data recording means is operatively connected to the one of said axle treadles corresponding to the position of said record receiver, and means controlled by said record receiver shifting means for activating said recorder operation effecting means so that the recorder operation sequence count is increased accordingly for each manual shift operation of said receiver.

References Cited in the file of this patent

UNITED STATES PATENTS

| | | |
|---|---|---|
| 2,313,627 | Cooper | Mar. 9, 1943 |
| 2,330,872 | Diebald | Oct. 5, 1943 |
| 2,621,101 | Cooper | Dec. 9, 1952 |
| 2,672,393 | Cooper | Mar. 16, 1954 |
| 2,755,995 | Black | July 24, 1956 |